United States Patent
Kimura et al.

(10) Patent No.: US 7,276,263 B2
(45) Date of Patent: Oct. 2, 2007

(54) PROCESS FOR PRODUCING LOW REFLECTION GLASS PLATE, AND LOW REFLECTION GLASS PLATE

(75) Inventors: Yukio Kimura, Aiko-gun (JP); Yoshiya Tsutsui, Kobe (JP); Kazuo Gotou, Kobe (JP)

(73) Assignees: Asahi Glass Company, Limited, Tokyo (JP); Mitsuboshi Belting Ltd., Kobe-shi (JP)

( * ) Notice: Subject to any disclaimer, the term of this patent is extended or adjusted under 35 U.S.C. 154(b) by 16 days.

(21) Appl. No.: 11/178,453

(22) Filed: Jul. 12, 2005

(65) Prior Publication Data

US 2005/0243426 A1    Nov. 3, 2005

Related U.S. Application Data

(63) Continuation of application No. PCT/JP2004/00937, filed on Jan. 30, 2004.

(30) Foreign Application Priority Data

Jan. 31, 2003   (JP) .............................. 2003-024774

(51) Int. Cl.
    B05D 5/06   (2006.01)
(52) U.S. Cl. .................. 427/162; 427/421.1; 427/426; 427/443.2; 428/432
(58) Field of Classification Search ............... 427/162, 427/421.1, 426, 443.2; 428/432
    See application file for complete search history.

(56) References Cited

U.S. PATENT DOCUMENTS 5,108,479 A * 4/1992 Hirano ...................... 65/60.52
6,686,049 B1 * 2/2004 Nakamura et al. .......... 428/428

FOREIGN PATENT DOCUMENTS

| EP | 0422582 | 4/1991 |
| EP | 1029832 | 8/2000 |
| JP | 3-34211 | 2/1991 |
| JP | 3-126642 | 5/1991 |
| JP | 10-231145 | 9/1998 |
| JP | 11-76800 | 3/1999 |
| JP | 2000-109345 | 4/2000 |
| JP | 2002-194295 | 7/2002 |
| JP | 2004-91286 | 3/2004 |
| JP | 2004-149397 | 5/2004 |

* cited by examiner

Primary Examiner—Alain L. Bashore
(74) Attorney, Agent, or Firm—Oblon, Spivak, McClelland, Maier & Neustadt, P.C.

(57) ABSTRACT

The present invention provides a low reflection glass plate which has an effect of reducing reflectance against light even at an incident angle of 60° sufficiently, in high yield. A process for producing a low reflection glass plate, characterized by the use of a treating fluid (1) comprising a resin B1, fine gold particles, an organic metal compound of at least one metal (M1) selected from the group consisting of iron, titanium and zirconium, and an organic solvent, and a treating fluid (2) comprising a film-forming compound, a resin B2 having the same thermal decomposition temperature as the resin B1 or a higher thermal decomposition temperature than the resin B1, wherein said process comprises applying the treating fluid (1) on the surface of a transparent glass substrate, followed by drying at a temperature of from 50 to 250° C. to remove the organic solvent, further applying the treating fluid (2), followed by drying at from 50 to 250° C. to remove the organic solvent, and then baking the treated transparent glass substrate at a temperature of from 400 to 800° C.

7 Claims, 4 Drawing Sheets

Cross-sectional view along line A-A

Cross-sectional view along line A-A

PROCESS FOR PRODUCING LOW REFLECTION GLASS PLATE, AND LOW REFLECTION GLASS PLATE

TECHNICAL FIELD

The present invention relates to a process for producing a low reflection glass plate (a glass plate with a low reflection film), and a low reflection glass plate. More particularly, it relates to a process for producing a low reflection glass plate having low reflectance and excellent abrasion resistance, chemical resistance, etc., and a low reflection glass plate having the above excellent properties.

BACKGROUND ART

Heretofore, low reflection glass plates have usually been prepared by the following methods (see, for example, JP-A-2002-194295). That is:

(1) A method for preparing a low reflection glass plate by laminating a multi-layer film utilizing optical interference, wherein the multi-layer film is obtained by laminating high refractive index materials such as titanium oxide and low refractive index materials such as silicon oxide on a glass substrate by a vacuum film-forming method or a vapor phase method such as sputtering while controlling refractive indices and film thicknesses so as to make interfaces between the films distinct.

(2) A method for preparing a low reflection glass plate utilizing optical interference, which comprises laminating at least two layers consisting of light absorption materials such as titanium nitride and low refractive index materials such as silicon oxide on a glass substrate by a vapor phase method such as sputtering while controlling refractive indices and film thicknesses so as to make interfaces between the films distinct, (3) A method for preparing a low reflection glass plate utilizing optical interference, which comprises laminating at least two layers consisting of high refractive index materials such as titanium oxide and low refractive index materials such as silicon oxide on a glass substrate by a sol-gel method using a metal alkoxide, etc. while controlling refractive indices and film thicknesses so as to make interfaces between the films distinct, and (4) A method for preparing a low reflection glass plate utilizing optical interference, which comprises laminating at least two layers consisting of high refractive index materials such as titanium oxide and low refractive index materials such as silicon oxide on a glass substrate by a sol-gel method using an aqueous metal ion-containing solution, a metal alkoxide, etc. while controlling refractive indices and film thicknesses so as to make interfaces between the films distinct.

Further, the above prior art has various problems as mentioned below, and as a method for solving these problems, the present inventors have proposed a process for producing a low reflection glass plate having a low reflectance and excellent abrasion resistance, chemical resistance, etc., by a process-wise advantageous method of applying a coating liquid, drying and baking (see, Japanese Patent Application 2002-359976). Further, a method for forming a colored baked film having excellent chemical resistance on a glass substrate, has been proposed (see, JP-A-10-231145).

However, the above vacuum film-forming method or the sputtering method requires large-scale equipment, and therefore there is a problem that the cost tends to be high. Further, a low reflection glass plate utilizing optical interference, which is prepared by a sol-gel method using e.g. a metal alkoxide, has a problem of deterioration in productivity because high temperature drying is required after applying a treating fluid on each layer so as to make interfaces between the films distinct.

Further, a low reflection glass plate having a low reflectance and excellent abrasion resistance, chemical resistance, etc., which can be obtained in the method proposed by the present inventors, has excellent low reflecting properties against light at a specific incident angle of 5°, but does not have a sufficient effect of reducing reflectance against light at other incident angles e.g. at an incident angle of 60°.

Accordingly, the first object of the present invention is to overcome the problems of the above prior art, and to provide a low reflection glass plate having low reflectance and excellent abrasion resistance, chemical resistance, etc., preferably showing a transmission color of blue, with good productivity.

Further, the second object of the present invention is to provide a low reflection glass plate having a sufficient effect of reducing reflectance against light at an incident angle of 60°, with good productivity.

DISCLOSURE OF THE INVENTION

The above objects can be accomplished by the following present invention. Namely, the present invention provides a process for producing a low reflection glass plate, characterized by the use of a treating fluid (1) comprising a resin B1, fine gold particles, an organic metal compound of at least one metal (M1) selected from the group consisting of iron, titanium and zirconium, and an organic solvent, and a treating fluid (2) comprising a film-forming compound, a resin B2 having the same thermal decomposition temperature as the resin B1 or a higher thermal decomposition temperature than the resin B1 and an organic solvent, said process comprising applying the treating fluid (1) on the surface of a transparent glass substrate, followed by drying at a temperature of from 50 to 250° C. to remove the organic solvent, further applying the treating fluid (2), followed by drying at a temperature of from 50 to 250° C. to remove the organic solvent, and then baking the treated transparent glass substrate at a temperature of from 400 to 800° C.

In the production process of the above present invention, it is preferred that the thermal decomposition temperature of the resin B1 is from 150 to 300° C.; the organic metal compound is an organic iron compound; the M1/Au ratio (mass ratio) of the metal (M1) in the organic metal compound to the fine gold particles, is from 3 to 25; the resin B1 is nitrocellulose, and the resin B2 is nitrocellulose; the resin B1 is nitrocellulose, and the resin B2 is ethyl cellulose; the transparent glass substrate is a heat absorbing glass or a highly heat absorbing glass, the treating fluid (2) contains an organic silicon compound as a film-forming compound, and the transmission color of the obtained low reflection glass plate is blue; and the film made of the treating fluid (1) has a film thickness of from 5 to 50 nm after baking, and the film made of the treating fluid (2) has a film thickness of from 50 to 350 nm after baking.

Further, the present invention provides a low reflection glass plate comprising a transparent glass substrate and a low reflection film formed on at least one side of the substrate, characterized in that the above low reflection film contains an oxide of at least one metal selected from iron, titanium and zirconium, a film-forming oxide and fine gold particles.

In the low reflection glass plate of the present invention, it is preferred that said at least one metal selected from iron, titanium and zirconium, is iron; the film-forming oxide is a silicon oxide; the average primary particle diameter of the fine gold particles contained in the low reflection film is from 1.0 to 12.0 nm, and the standard deviation is at most "average primary particle diameter+2.0 nm"; and the amount of the fine gold particles present in the low reflection film is from 0.01 to 0.80 atomic % based on the total atoms in the low reflection film.

Further, in the low reflection glass plate of the present invention, it is preferred that the transparent glass substrate is a heat absorbing glass or a highly heat absorbing glass, and the transmission color is blue; and the visible light transmittance prescribed in JIS-R3106 (1999) is from 30 to 85%.

Further, in the low reflection glass plate of the present invention, it is preferred that the visible light transmittance prescribed in JIS-R3106 (1999) is from 70 to 85%, and said low reflection glass plate is for a window glass for automobiles; the visible light reflectance at an incident angle of 5° of the glass surface prescribed in JIS-R3106 (1999) is at most 5.5%, and said low reflection glass plate is for a window glass for automobiles; and the visible light reflectance at an incident angle of 60° of the glass surface prescribed in JIS-R3106 (1999) is at most 11.0%, and said low reflection glass plate is for a window glass for automobiles.

In the production process of the present invention, the transparent glass substrates coated with the treating fluid (1) and/or the treating fluid (2), are not dried at a high temperature, but dried at a low temperature of from 50 to 250° C., respectively. Therefore, the film composition continuously changes in the direction of the film depth, the interface between two types of the films is indistinct, a film which looks like a single-layer is formed, and the components change in the direction of the film thickness. Namely, the refractive index changes in the direction of the film thickness, and therefore, good reflection properties are given.

Further, excellent low reflecting properties are given against light at an incident angle of 60° by addition of an organic metal compound of at least one metal selected from the group consisting of iron, titanium and zirconium to the treating fluid (1) at a mass ratio within the specific range to fine gold particles. Here, the "light at an incident angle of 60°" means light which enters at 60° to the normal line of a glass plate. Further, the meaning of "light at an incident angle of 5°" is similar. In order to reduce the reflecting properties against light at an incident angle of 60°, it is necessary to reduce the reflectance against light in the vicinity of a wavelength of 630 nm in a reflection spectroscopic curve measured at an incident angle of 5°. However, a film containing an oxide of an organic metal compound of at least one metal selected from the group consisting of the iron, titanium and zirconium, particularly, an oxide of an organic iron compound and fine gold particles in combination, shows an absorption peak in the vicinity of a wavelength of 630 nm, and yet has a peak broad in shape in the absorption curve. Accordingly, the film formed by the method of the present invention has effects of reducing reflectance not only against light at an incident angle of 5° but also against light at an incident angle of 60°.

Further, in a case where the transparent glass substrate is a heat absorbing glass or a highly heat absorbing glass such as a glass showing a transmission color of green, not only a heat cutting effect can be achieved, but also the transmission color can be made blue by the distribution characteristics in the direction of film thickness of fine gold particles acting as a color source and a metal oxide formed by thermal decomposition of a film-forming compound containing an organic metal compound of at least one metal selected from the group consisting of iron, titanium and zirconium as a matrix, particularly, an organic iron compound.

BEST MODE FOR CARRYING OUT THE INVENTION

Figure 1:
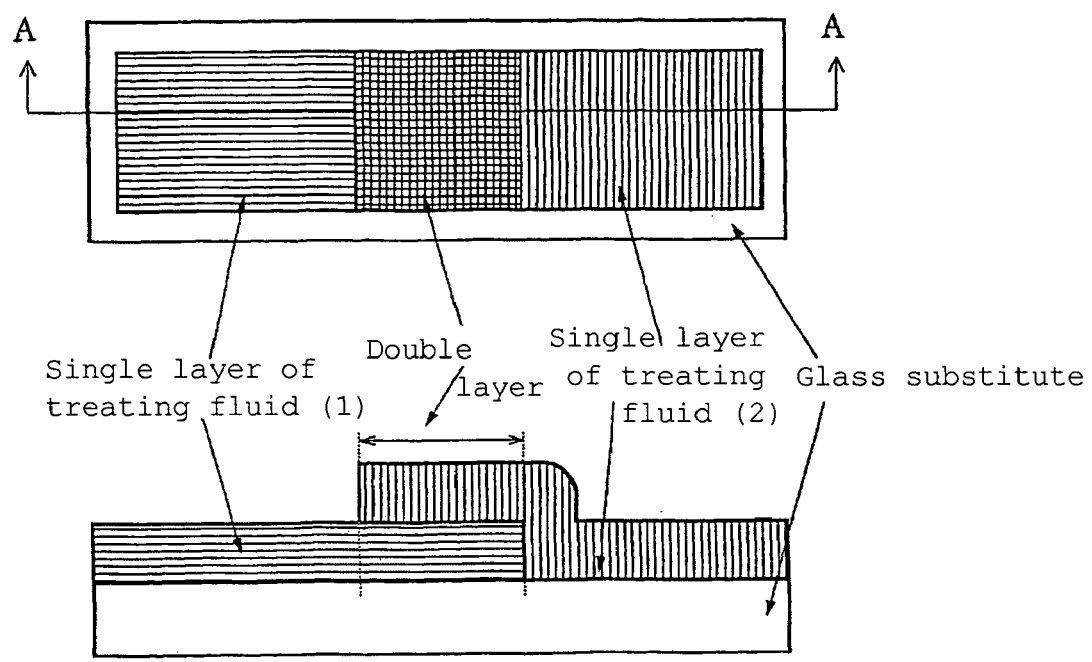
FIG. 1 is a schematic view illustrating the film thicknesses of a first layer and a second layer formed in the present invention.

Now, the present invention will be described in further detail with reference to preferred embodiments.

Invention of Production Process

Fine gold particles to be used in the present invention can be prepared according to the invention disclosed in e.g. JP-A-11-76800. Namely, as disclosed in the above document, fine gold particles having particle diameters of from 1 to 100 nm, preferably from 1 to 50 nm can be obtained by dissolving a gold compound in a solvent, and then reducing gold ions in a solvent in the presence of a polymeric pigment dispersant. The fine gold particles are protected by a polymeric pigment dispersant, and can be dispersed in a solvent such as an alcohol, a ketone, an ether or toluene.

The polymeric pigment dispersant to be used in the process for producing the fine gold particles is not particularly limited, but may, for example, be (1) a polymer of a comb structure having pigment affinity groups in the main chain and/or in a plurality of side chains, and having a plurality of side chains constituting solvent affinity portions, (2) a polymer having a plurality of pigment affinity portions made of pigment affinity groups in the main chain, (3) a linear polymer having a pigment affinity portion composed of a pigment affinity group at one terminal portion of the main chain. As a specific product commercially available, Solsparse Series (manufactured by Zeneka K.K.), Disper Byk Series (manufactured by BYK-Chemie K.K.), EFKA Series (manufactured by EFKA Chemicals B.V.), and Ajisper PB711 or Ajisper PA111 (manufactured by AJINO-MOTO CO., INC.) may, for example, be mentioned.

Further, a solution having fine gold particles dispersed independently in an organic solvent may be prepared by a method so-called a gas evaporation method as disclosed in JP-A-3-34211. Namely, the above solution is obtained by injecting helium inert gas into a chamber to evaporate the metal, and contacting it with the inert gas to let it cool and condense. In this case, the particle surface is coated by injecting the vapor of the organic solvent at the stage where the particles are isolated immediately after the production. As the organic solvent, a solvent such as p-xylene, toluene or $\alpha$-terepineol is used, and fine gold particles dispersed independently in the organic solvent, having particle diameters preferably of from 1 to 100 nm, more preferably of from 1 to 50 nm, can be obtained.

Otherwise, a dispersion may also be prepared by dispersing fine gold particles having particle diameters of preferably from 1 to 100 nm, more preferably from 1 to 50 nm, in a polymer soluble in e.g. an alcohol, a ketone, an ether or toluene. Particularly, a polymer or oligomer having at least one functional group selected from the group consisting of a cyano group (—CN), an amino group (—NH$_2$) and a thiol group (—SH) at terminal portions or in side chains of the polymer molecule is used. Specifically, the polymer or oligomer has at least one functional group selected from the above group consisting of a cyano group (—CN), an amino group (—NH$_2$) and a thiol group (—SH) at terminal portions or in side chains of the molecule, wherein the skeleton comprises polyethylene oxide, polyvinyl alcohol, polyamide 11, polyamide 6, polyamide 6.6, polyamide 6.10, polyethylene terephthalate, polystyrene or the like, and the melting point or the softening point is from 40 to 100° C. The number average molecular weight of the oligomer is not particularly limited, but is approximately from 500 to 6,000. Particularly, the above functional groups readily form covalent bonds or coordinate bonds with gold atoms on the surface of fine gold particles, whereby the grain growth is suppressed, and dispersibility of the fine gold particles increases.

As the organic metal compound of at least one metal (M1) selected from the group consisting of iron, titanium and zirconium to be used in the present invention, for example, iron octenoate, iron naphthenate, iron acetyl acetonate or iron alcoholate which is soluble in after-mentioned organic solvents, and after-mentioned organic metal compounds of titanium and zirconium can be used. Among these organic metal compounds, an organic iron compound is particularly preferred in consideration of the balance between reflectance and transmittance or the abrasion resistance of the film.

These organic metal compounds vary depending on compounds to be used. However, the M1/Au ratio is suitably from 3 to 25 by mass ratio to the fine gold particles. If M1/Au is less than 3, the amount of the organic metal compound is too small, and the absorption peak of the resulting low reflection film will not reach 630 nm as aimed, and will stay in the vicinity of 550 nm. Accordingly, the reflectance against light at an incident angle of 60° tends to be hardly reduced. On the other hand, if M1/Au exceeds 25, the amount of the organic metal compound becomes large, and the refractive index of the film formed will increase, and the reflectance will hardly be reduced. Further, also in the film, M1/Au is present in the same mass ratio, i.e. M1/Au is suitably in the range of from 3 to 25. The above organic metal compound changes into a metal oxide by baking and will be present in the film in that form.

It is necessary that the resin B1 to be used in the present invention is soluble in an organic solvent, maintains the viscosity of the treating fluid at a proper level so as to facilitate application of the treating liquid on the transparent glass substrate and handling of the coated material after drying, and is thermally decomposable at a relatively low temperature at the time of baking. The thermal decomposition temperature of the resin B1 is preferably from 150 to 400° C., more preferably from 150 to 300° C. If the thermal decomposition temperature is below 150° C., the resin B1 tends to be thermal decomposed in the drying step of the coating film. On the other hand, if the thermal decomposition temperature exceeds 400° C., the strength of the oxide film tends to be insufficient after baking.

As a specific example of the resin B1, a thermally decomposable cellulose such as nitrocellulose, a polyvinyl chloride or a polyacrylate such as polymethyl methacrylate may be mentioned. The resin B1 is more preferably nitrocellulose. This nitrocellulose preferably has a weight-average molecular weight of from 2,000 to 200,000, more preferably from 3,000 to 150,000. The amount of this nitrocellulose is determined by the viscosity of the treating fluid (1) and the desired film thickness, and is not particularly limited. However, for example, the nitrocellulose to be blended in the treating fluid (1) is added preferably in the range of from 1.0 to 30.0 parts by mass based on 100 parts by mass of the treating fluid (1), though the amount varies with the molecular weight or the method of applying the treating fluid.

The film-forming compound which is contained in the treating fluid (2) and which may preferably be contained also in the treating fluid (1) as the case requires, may be an organic silicon compound which forms a low refractive index film, such as a silicon alkoxide such as ethoxide, propoxide or butoxide, or various silicon oil or silicon varnish having a polysiloxane skeleton, or an organic metal compound, such as an alkoxide such as ethoxide, propoxide or butoxide, of titanium, zirconium, cerium or cobalt, a chelate such as acetylacetonate or aminate, a metal salt of an organic acid such as a stearate, an octylate, a naphthenate or a glycolate, or an oligomer obtained by polycondensation of the above alkoxide. The above film-forming compound changes into a film-forming oxide by baking and will be present in a film in that form.

The resin B2 to be used in the present invention may be the same resin as the above mentioned resin B1, or may be a resin having a thermal decomposition temperature higher than that of the resin B1. It is necessary that such resin B2 is soluble in the after-mentioned organic solvent, maintains the viscosity of the treating fluid at a proper level so as to facilitate application of the treating fluid on the glass substrate and handling of the treating fluid after drying, and is thermally decomposable at a relatively high temperature during baking. The thermal decomposition temperature of the resin B2 is preferably from 150 to 500° C. If the thermal decomposition temperature is less than 150° C., reduction of the reflectivity of the film tends to be insufficient. On the other hand, if the thermal decomposition temperature exceeds 500° C., strength of the oxide film tends to be insufficient after baking. Here, the thermal decomposition temperature of the resin is meant for a temperature (0° C.) at which at least 90 mass % of the resin is burned out.

A specific example of the resin B2 may be a thermally decomposable cellulose such as ethyl cellulose or the above nitrocellulose, a polyvinyl chloride or a polyacrylate such as polymethyl methacrylate. The resin B2 is more preferably ethyl cellulose or the above nitrocellulose. The former ethyl cellulose has a weight-average molecular weight of preferably from 8,000 to 150,000, more preferably from 10,000 to 120,000. The amount of this resin B2 is determined by the viscosity of the treating fluid (2) and the desired film thickness, and is not limited. However, the resin B2 to be blended in the treating fluid (2) varies also depending on the molecular weight or the method of applying the treating fluid. For example, the resin B2 is preferably added within a range of from 1.0 to 30.0 parts by mass based on 100 parts by mass of the treating fluid (2).

The organic solvent to be used in the present invention is not particularly limited so long as it can stably disperse fine gold particles without agglomeration, and can dissolve the film-forming compound containing an organic metal compound, the resin B1 and the resin B2, and it may suitably be selected depending upon e.g. the method of applying the treating fluid. Specifically, a high boiling point solvent such as methacresol, dimethylformamide, butyl carbitol, α-terpineol, diacetone alcohol, triethylene glycol, paraxylene, toluene or the like is preferred for coating the surface of the glass plate with the above treating fluid.

The treating fluid (1) and the treating fluid (2) are prepared as follows. First of all, prescribed amounts of the solvent and the resin are measured and preferably stirred for from 20 to 40 minutes at a temperature of from 60 to 100° C. (preferably from 70 to 80° C.). Necessary components selected from fine gold particles, an organic metal compound and a film-forming compound, are blended in this solution, preferably followed by stirring and mixing for from 20 to 40 minutes at a temperature of from 60 to 100° C. (preferably from 70 to 80° C.). The resulting solution is poured into a storage container and cooled naturally to obtain the above treating fluid (1) or the treating fluid (2).

Further, the film-forming compound may also be added to the treating fluid (1) and/or the treating fluid (2). However, it is preferred that the outermost layer of the low reflection film formed has a low refractive index. Therefore, it is preferred that the treating fluid (2) contains an organic silicon compound, and the treating fluid (1) contains a film-forming compound having a refractive index higher than that of the organic silicon compound. Further, in a case where the treating fluid (1) contains the organic metal compound and the fine gold particles, and the treating fluid (2) contains the organic silicon compound as a film-forming compound, the resulting low reflection glass plate preferably shows blue when the treating fluid (1) and the treating fluid (2) are applied on green glass.

The amount of the fine gold particles to be blended in the treating fluid (1) is suitably determined depending on the desired transmittance, reflectance or color of the low reflection glass plate and the method of applying the above treating fluid. However, it is preferred to blend the gold particles so that the ratio of the total number (M2) of metal atoms (including Si) in the solid content in the film-forming compound (including the organic metal compound and the organic silicon compound) other than the fine gold particles to the number (N) of gold atoms in the fine gold particles contained simultaneously in the treating fluid (1), will be within a range of M2/N=0.1 to 100. If M2/N is less than 0.1, the fine gold particles will sinter one another to form noble metal agglomerates, thus leading to a state which is not different from a case where fine gold particles alone are applied and baked on the surface of the glass plate. Accordingly, there may be a case where colloidal coloration as the object of the present invention can not be obtained. On the other hand, if M2/N exceeds 100, there may be a case where the object of the present invention cannot be achieved because the fine gold particles in the treating fluid remarkably decrease, and the glass plate is not effectively colored.

More particularly, the amount of the gold colloidal dispersion to be added to the treating fluid (1) varies depending upon the concentration of the gold colloidal dispersion and the desired optical properties, and is preferably from 0.001 to 10 parts by mass as the solid content of the fine gold particles, based on 100 parts by mass of the treating fluid (1). If the solid content of the fine gold particles is less than 0.001 part by mass, the transmission color of the resulting low reflection glass plate tends to be gray because the amount of the gold colloidal dispersion is too small. Therefore, the reflectance against light at an incident angle of 60° tends to be hardly reduced. On the other hand, if the solid content of the fine gold particles exceeds 10 parts by mass, the transmittance of the resulting low reflection glass plate remarkably decreases because the amount of the gold colloidal dispersions is too large, whereby the desired optical properties tend to be hardly obtained.

Further, the organic metal compound is added to the treating fluid (1) preferably in an amount of from 0.01 to 10 parts by mass, based on 100 parts by mass of the treating fluid (1). If the amount of the organic metal compound is less than 0.01 part by mass, the transmission color of the resulting low reflection glass plate tends to be gray because the amount of metals such as iron is too small, and therefore the reflectance against light at an incident angle of 60° tends to be hardly decreased. On the other hand, if the amount of the organic metal compound exceeds 10 parts by mass, the refractive index of the film formed will increase because the amount of the organic metal compound is too large, and it tends to be difficult to decrease the reflectance.

The amount of the film-forming compound to be blended in the treating fluid (1) or the treating fluid (2) varies depending upon the type of the film-forming compound, the amounts of e.g. the organic solvent, the resin B2 and the resin B1 or the coating method, but it is preferably adjusted to have a film thickness of from 5 to 50 nm after baking in the case where the film-forming compound is blended in the above treating fluid (1). Particularly, the amount of the film-forming compound is preferably from 0.5 to 20 parts by mass based on 100 parts by mass of the treating fluid.

If the concentration is such that the film thickness after baking will be less than 5 nm, the film-forming properties of the resulting low reflection film will not be improved, and there may be a case where a film having low film-strength can only be obtained. On the other hand, if the above film-forming compound is added in an amount to have a film thickness of more than 50 nm after baking, the amount of the above film-forming compound blended in the low reflection film is too large, and there may be a case where the reflectance of the resulting film can not be made sufficiently low. Accordingly, in the present invention, the thickness after baking of the film made of the above treating fluid (1), is preferably adjusted to be from 5 to 50 nm also in order to obtain excellent film-forming properties and an excellent low reflection film.

The amount of the film-forming compound to be blended in the above treating fluid (2) varies depending upon the types and amounts of the resin B2 and the organic solvent and the coating method, but is preferably adjusted so that the film made of the above treating fluid (2) will have a film thickness of from 50 to 350 nm after baking. If the film-forming compound is added in an amount to have a film thickness of less than 50 nm after baking, there may be a case where a film excellent in low reflecting properties can not be obtained. On the other hand, if the film-forming compound is added in an amount to have a film thickness of more than 350 nm, the amount of the film-forming compound blended in the low reflection film tends to be too large, and there may be a case where a film having low film-strength can only be obtained. Accordingly, in the present invention, the thickness after baking of the film made of the above treating fluid (2) is preferably adjusted to be from 50 to 350 nm also in order to obtain excellent film-forming properties and an excellent low reflection film.

The transparent glass substrate to be used in the present invention is not particularly limited. However, a heat absorbing glass or a highly heat absorbing glass in which a heat-shielding effect is further increased, is preferably used. Further, a colorless float glass may also be used. For example, in an application requiring a heat-shielding effect, to e.g. a window glass for automobiles, a green glass substrate is preferably used because a colored glass plate having low reflecting properties and a heat-shielding effect can be obtained. The green glass plate may be any so long as it is green-colored. For example, a green glass plate containing a soda-lime silica glass component as the base component and containing $Fe_2O_3$, NiO, $TiO_2$ or the like suitably blended therein, and a green glass plate containing $Fe_2O_3$, CoO, Se or the like blended in the glass components, may be mentioned. A float glass, an alkali glass or the like is included in the green glass plate. The above transparent glass substrate preferably has a thickness of from 0.4 to 3.0 mm. The transparent glass substrate preferably has a visible light transmittance of at least 90%, particularly preferably at least 95%.

As a method of coating the glass substrate with the treating fluid, spray coating, dip coating, roll coating, spin coating, flexographic printing or screen printing may, for example, be mentioned. The glass substrate is coated with the treating fluid (1) and dried at a temperature of from 50 to 250° C. for from 1 to 30 minutes to remove the organic solvent. Then, the glass substrate is further coated with the treating fluid (2) and dried at a temperature of from 50 to 250° C. for from 1 to 30 minutes to remove the organic solvent, and it is then baked in a furnace at a temperature of from 400 to 800° C. for from 1 to 10 minutes. Then, the resulting glass substrate is cooled, whereby the low reflection glass plate of the present invention can be obtained. The above method makes the interface between the first layer and the second layer indistinct, and the two layers are formed as if they constitute one layer.

The above coating film is preferably baked at a temperature of from 400 to 800° C. If it is baked at a temperature lower than 400° C., the film-forming properties of the film will deteriorate. On the other hand, if it is baked at a temperature higher than 800° C., fine gold particles will be agglomerated, such being undesirable.

The low reflection glass plate obtained by the method of the present invention as stated above is useful as a window glass for vehicles such as automobiles because the low reflection glass plate has low reflecting properties and a heat-shielding effect if the glass substrate is a heat absorbing glass or a highly heat absorbing glass. Further, the low reflection glass plate is also useful for display which does not require high transmission performance.

Low Reflection Glass Plate

Further, the present invention provides a low reflection glass plate comprising a transparent glass substrate and a low reflection film formed on at least one side of the substrate, characterized in that the above low reflection film contains an oxide of at least one metal selected from iron, titanium and zirconium, a film-forming oxide and fine gold particles.

The above low reflection glass plate of the present invention can be produced by the production process of the present invention, but the production process is not limited to the production process of the present invention. The preferred embodiment of the low reflection glass plate of the above present invention is as described above in the description of the above production process. However, as other preferred embodiments, the fine gold particles contained in the low reflection film have an average primary particle diameter of from 1.0 to 12.0 nm, preferably from 1.0 to 8.0 nm and a standard deviation of at most "average primary particle diameter+2.0 nm", preferably at most "average primary particle diameter+1.0 nm".

If the fine gold particles contained in the above low reflection film have an average primary particle diameter of less than 1.0 nm, such small fine gold particles can hardly be produced. On the other hand, if the average primary particle diameter of the fine gold particles exceeds 12.0 nm, or the standard deviation of the fine gold particles exceeds "average primary particle diameter+2.0 nm", there will be a case where abrasion resistance of the low reflection film is insufficient under the severe usage conditions.

The amount of the fine gold particles present in the low reflection film (film composed of the first layer and the second layer) of the low reflection glass plate of the present invention is from 0.01 to 0.80 atomic %, preferably from 0.05 to 0.3 atomic %, based on the total atoms in the low reflection film. If the amount of the fine gold particles exceeds the above range, the fine gold particles will sinter one another to form noble metal agglomerates, leading to a state which is not different from a case where fine gold particles alone are applied and baked on the surface of the glass plate. Accordingly, there may be a case where colloidal coloration as the object of the present invention cannot be obtained. On the other hand, if the amount of the fine gold particles is less than the above range, the fine gold particles in the above low reflection film remarkably decrease, whereby there may be a case where the object of the present invention cannot be achieved because the glass plate cannot effectively be colored.

Further, the amount of at least one metal selected from the group consisting of iron, titanium and zirconium present in the low reflection film of the low reflection glass plate of the present invention is from 0.01 to 8.0 atomic %, preferably from 1.0 to 4.0 atomic %, based on the total atoms in the low reflection film. If the amount of such metal is less than the above range, the amount of the metal such as iron is too small, whereby the transmission color of the resulting low reflection glass plate tends to be gray, and the reflectance against light at an incident angle of 60° tends to be hardly reduced. On the other hand, if the amount of the above metal exceeds the above range, the amount of the organic metal compound is too large, and the refractive index of the film formed increases, whereby the reflectance tends to be hardly reduced.

Further, the low reflection glass plate of the present invention preferably has a visible light transmittance of from 30 to 85% as prescribed in JIS-R3106 (1999). In a case where the low reflection glass is plate is used as a window glass for automobiles (particularly a windshield glass for automobiles or a front door glass for automobiles), it is preferably from 70 to 85%. Further, in the case where it is used as a window glass for automobiles, the glass surface glares if it has high reflectance, whereby the high-quality image will be impaired. Accordingly, the visible light reflectance at an incident angle of 5° of the glass surface prescribed in JIS-R3106 (1999) is preferably at most 5.5%, particularly preferably at most 5.0%. Further, the visible light reflectance at an incident angle of 60° is preferably at most 11.0%.

Further, the low reflection glass plate formed by the present invention can also be used as a substrate constituting a laminate. The laminate has a structure having an interlayer or a heat insulating layer interposed between the first and second substrates, and the low reflection glass plate of the present invention can be used as the first and/or second substrate. Further, when the glass plates are laminated, the surface of each glass plate on which the low reflection film is formed, is preferably disposed inside with a view of obtaining the low reflection performance of the low reflection film. The interlayer may, for example, be transparent or colored polyvinyl butyral or ethylene vinyl acetate copolymer. The heat insulating layer may, for example, be a layer filled with an inert gas, air, nitrogen or the like, or a vacuum layer.

The laminate may, for example, be a laminated glass using either a heat absorbing glass or a highly heat absorbing glass as the first substrate and/or the second substrate, and using polyvinyl butyral as the interlayer. A laminated glass using a low reflection highly heat absorbing glass as the first and/or the second substrate and using polyvinyl butyral as the interlayer, is particularly preferred, because the highly heat absorbing glass has a low transmittance, and the reflectance against light which enters from the film surface can be reduced at the side where no film is formed. The laminated glass is suitably used for a window for transport equipments (for example, a window for vehicles) or a cover glass for meter instruments.

EXAMPLES

Now, the present invention will be described in further detail with reference to Examples and Comparative Examples. Here, "%" in the description is based on mass standard unless otherwise specified. Further, the gold colloidal dispersions used in the following Examples and Comparative Examples are as follows:

Gold colloidal dispersion (a): Gold colloidal dispersion (a) was prepared by a vapor phase method (a gas evaporation method), the average primary particle diameter of the fine gold particles in the dispersion was 4 nm, the solid content as gold was 7%, and the average primary particle diameter in the coating fluid was the same.

Gold colloidal dispersion (b): Gold colloidal dispersion (b) was prepared by a liquid phase method, the average primary particle diameter of the fine gold particles in the dispersion was 13 nm, the solid content as gold was 7%, and the average primary particle diameter in the coating fluid was the same.

Further, the respective low reflection glass plates obtained in the following respective Examples and Comparative Examples were evaluated as follows.

1. Optical Properties

The Hz ratio (JIS K6714 (1994)), transmittance and transmission color (JIS Z8729 (1999)) of each sample were measured by using a color difference meter NDH-300A (manufactured by Nippon Denshoku Industries Co., Ltd.) and turbidimeter ZE2000 (manufactured by Nippon Denshoku Industries Co., Ltd.), and the transmittance and reflectance of each sample were measured by a spectrophotometer UV3100Ps (manufactured by SIMADZU), whereupon the visible light transmittance (Tv) and visible light reflectance (Rv) (JIS-R3106 (1999)) of each sample, were calculated. Further, the reflectance was purely the reflectance on the front film surface only i.e. without including the rear surface reflection.

2. Chemical Resistance

(1) Alkali Resistance

Each sample was immersed in a 3% sodium hydroxide aqueous solution for 2 hours, and the transmittance and reflectance before and after the immersion were measured by a spectrophotometer, whereupon the visible light transmittance change ($\Delta Tv$) and visible light reflectance change ($\Delta Rv$) at an incident angle of 5° of each sample, were calculated. Practically, they are preferably at most 1.0%.

(2) Acid Resistance

Each sample was immersed in a 3% sulfuric acid aqueous solution for 2 hours, and the transmittance and reflectance before and after the immersion were measured by a spectrophotometer, whereupon the visible light transmittance change ($\Delta Tv$) and visible light reflectance change ($\Delta Rv$) at an incident angle of 5° of each sample, were calculated. Practically, they are preferably at most 1.0%.

3. Abrasion Resistance

(1) Rubbing Abrasion Test

A waste cloth was set at a contact part of a supporting stick provided on a rubbing tester (Rubbing Tester, manufactured by Taihei Rika Kogyo Kabushiki Kaisha), and an abrasion test was carried out by moving a carrier back and forth for 3,000 times against the supporting stick at a load of 1.0 kg while supplying water suitably. The state of the film surface was visually observed after the test. Further, the evaluation standards in Tables 1 to 7 are as follows.

○: No change of the film surface was observed after the abrasion test.

X: The film was abraded after the abrasion test.

If the abrasion resistance of the low reflection film of the low reflection glass plate of the present invention passes the above rubbing test, there will be no problems in the practical use. However, the low reflection glass plate can be used under more severe conditions depending on the use. Therefore, Taber abrasion test was carried out under more severe conditions.

(2) Taber Abrasion Test

By a Taber abrader, the abrasion wheel (CALIBRASE CS-10F) was set at a load of 250 gf, and rotated for 500 times. Then, the appearance was visually evaluated. Here, the evaluation standards are as follows.

1: No haze observed

2: Slight haze observed

3: Weak haze observed

4: Haze observed

5: Somewhat strong haze observed

6: Film partially abraded

7: Film entirely abraded

Examples 1 to 21, Comparative Examples 1 to 6

In Tables 1 to 7, the compositions of the treating fluid (1) and the treating fluid (2) used in Examples 1 to 21 and Comparative Examples 2 and 3 are shown. Here, the treating fluid (1) was prepared by adding the components other than the gold colloidal dispersion to the organic solvent in accordance with the blend ratio as disclosed in Tables 1 to 7, followed by heating and stirring for dissolution, and then adding the gold colloidal dispersion, followed by heating and stirring again. The treating fluid (2) was prepared by adding the respective components in the organic solvent in accordance with the blend ratio as disclosed in Tables 1 to 7, followed by heating and stirring for dissolution.

In Examples 1 to 21 and Comparative Examples 2 and 3, the treating fluid (1) was applied on a heat absorbing green glass (manufactured by Asahi Glass Company, Limited, trade name: UV cut glass) plate having a thickness of 3.5 mm by a screen printing and then dried for five minutes by an oven with a hot air circulation system at a temperature of 150° C. in an air atmosphere. Then, the treating fluid (2) having the same mass as the treating fluid (1), was applied thereon and dried for five minutes by the oven with a hot air circulation system at a temperature of 150° C. in an air atmosphere, and then baked for five minutes in a muffle furnace at a temperature of 600° C. Thus, samples of low reflection glass plates in Examples 1 to 21 and Comparative Examples 2 and 3 were obtained. The Comparative Example 1 is the case of the heat absorbing green glass alone, and the Comparative Examples 2 and 3 are Examples in which no organic iron compound was used for the treating fluid (1). Further, the thermal decomposition temperatures of nitrocellulose and ethyl cellulose used were 190° C. and 330° C., respectively.

In Tables 1 to 7, results of the test items of the low reflection glass plates obtained in Examples 1 to 21 and Comparative Examples 2 and 3, are shown. Here, the interfaces between the first layers and the second layers of the low reflection films in the Examples and Comparative Examples are indistinct, and therefore the film thickness of each layer is hardly measurable after forming the film by baking. With respect to the film thickness in Tables, the treating fluid (1) and the treating fluid (2) are applied on the glass substrate so as to have the treating fluid (1) and the treating fluid (2) partially overlapped as shown in FIG. 1, and dried and baked under the same conditions as mentioned above, and then the film thicknesses of the parts where the treating fluids are not overlapped, are measured to obtain the film thicknesses of the first layer and the second layer.

Figure 2:
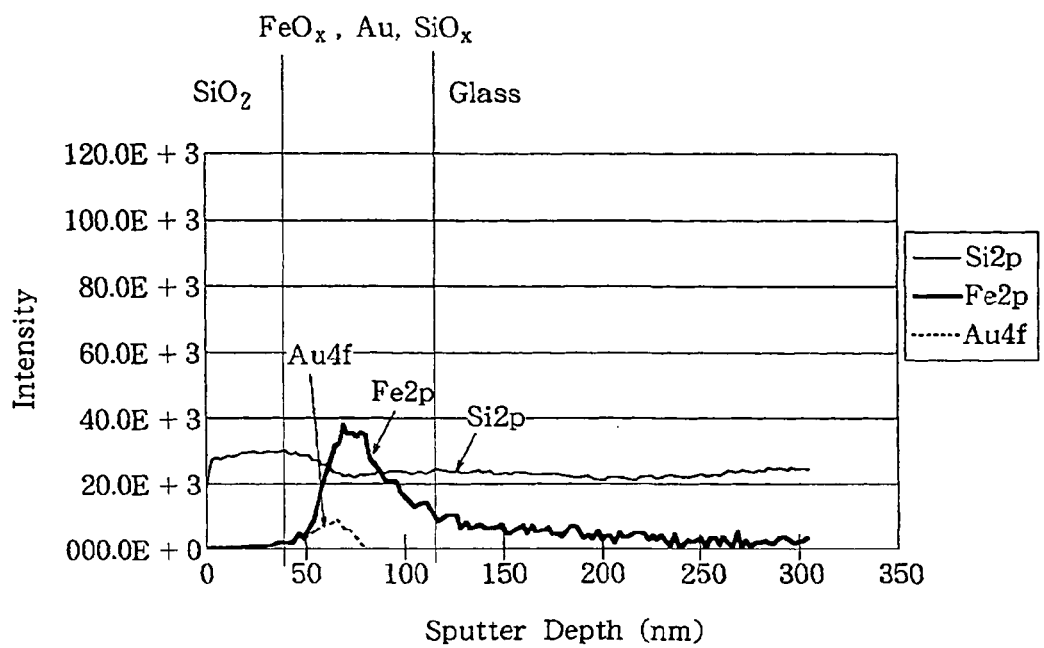
FIG. 2 shows photoelectron spectra which represent elemental analyses in a cross-sectional direction of the low reflection film in Example 4.
Figure 2:
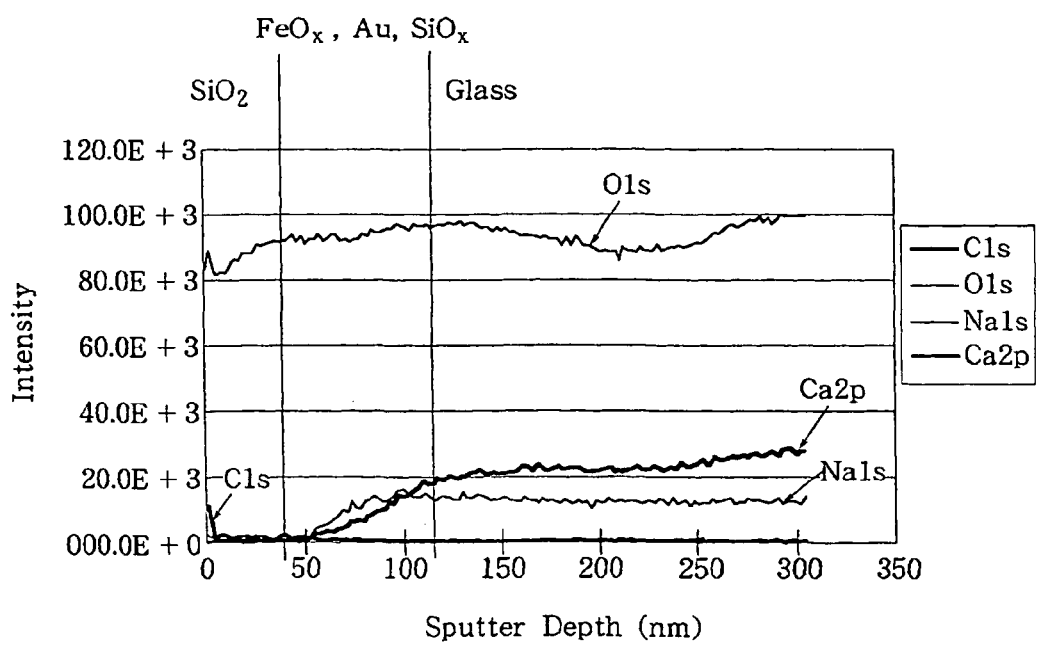
Figure 3:
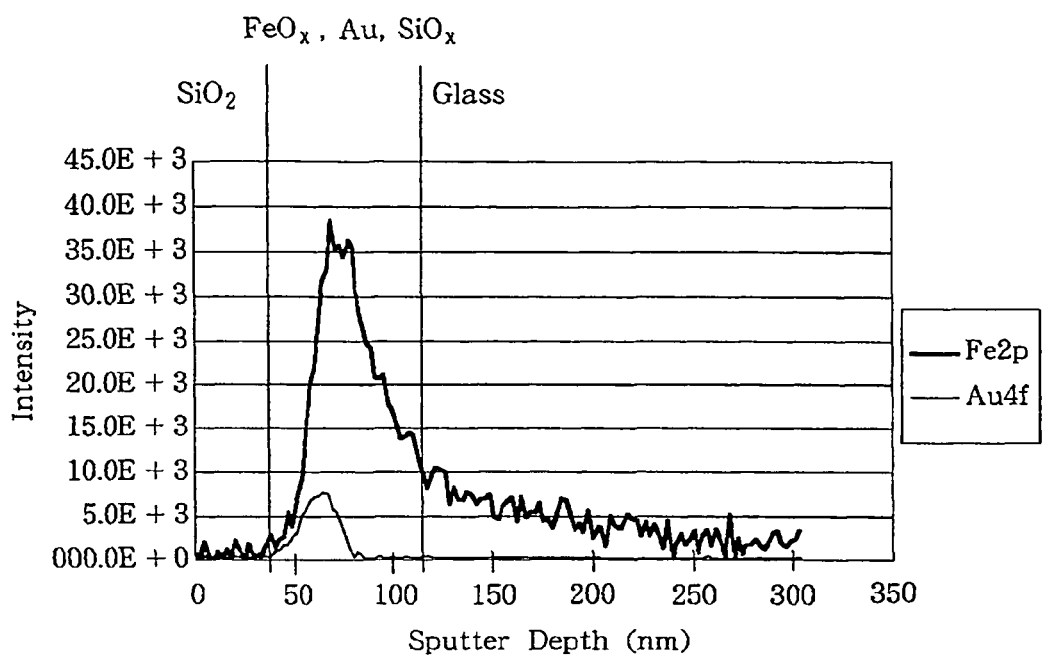
FIG. 3 is an enlarged view of the parts of gold and iron in FIG. 2.

Further, with respect to the low reflection film in Example 4, an elemental analysis in the cross-sectional direction of the film was carried out by photoelectron spectra (the measuring apparatus is an X-ray photoelectric spectrophotometer model number: ESCA-3400, manufactured by Shimadzu Corporation). The results are shown in FIGS. 2 and 3. FIG. 3 is an enlarged view of the parts of gold and iron in FIG. 2. From the result of this analysis, it is evident that the interface between the first layer and the second layer of the low reflection film is indistinct.

TABLE 1

|  | Composition of treating fluid | Ex. 1 | Ex. 2 | Ex. 3 | Ex. 4 |
|---|---|---|---|---|---|
| First layer treating fluid (1) | Butyl carbitol | 90.48 g | 90.52 g |  | 90.55 g |
|  | Gold colloidal dispersion (b) | 0.12 g | 0.08 g |  | 0.05 g |
|  | Nitrocellulose |  |  | 8.4 g |  |
|  | Organic titanium compound |  |  | — |  |
|  | Iron octenoate |  |  | 1.0 g |  |
|  | Wet film thickness |  |  | 13 μm |  |
|  | Film thickness after baking |  |  | 10 nm |  |
|  | Fe/Au (mass ratio) | 7.1 | 10.7 |  | 17.14 |
| Second layer treating fluid (2) | Terpineol | 87.50 g | 88.50 g | 87.50 g |  |
|  | Nitrocellulose |  |  | — |  |
|  | Ethyl cellulose |  |  | 7.0 g |  |
|  | Silicon varnish (50%) | 5.5 g | 4.5 g | 5.5 g |  |
|  | Wet film thickness |  |  | 12 μm |  |
|  | Film thickness after baking | 200 nm | 160 nm | 200 nm | 200 nm |
| Optical properties | Hz ratio (%) | 0.33 | 0.24 | 0.19 | 0.23 |
|  | Tv (%) | 77.38 | 79.93 | 79.90 | 79.06 |
|  | Rv (incident angle of 5°) (%) | 3.78 | 3.60 | 3.72 | 3.50 |
|  | Rv (incident angle of 60°) (%) | 9.12 | 10.57 | 9.89 | 10.03 |
|  | Transmission color: x | 0.3054 | 0.3044 | 0.3053 | 0.3043 |
|  | Transmission color: y | 0.3203 | 0.3206 | 0.3213 | 0.3199 |
| Chemical resistance | ΔTv (alkali resistance) (%) | 0.44 | 0.52 | 0.36 | 0.64 |
|  | ΔRv (alkali resistance) (%) | 0.35 | 0.48 | 0.44 | 0.31 |
|  | ΔTv (acid resistance) (%) | 0.34 | 0.66 | 0.45 | 0.43 |
|  | ΔRv (acid resistance) (%) | 0.44 | 0.34 | 0.66 | 0.19 |
| Abrasion resistance | Rubbing abrasion test (appearance) |  | ○ |  |  |
|  | Taber abrasion test (appearance) |  | 6 |  |  |

\* The amount of the gold colloidal dispersion is not as the solid content, but as the dispersion (the same applies in the following Tables).

TABLE 2

|  | Composition of treating fluid | Ex. 5 | Ex. 6 |
|---|---|---|---|
| First layer treating fluid (1) | Butyl carbitol | 90.57 g | 90.30 g |
|  | Gold colloidal dispersion (b) | 0.03 g | 0.30 g |
|  | Nitrocellulose | 8.4 g |  |
|  | Organic titanium compound | — |  |
|  | Iron octenoate | 1.0 g |  |
|  | Wet film thickness | 13 μm |  |
|  | Film thickness after baking | 10 nm |  |
|  | Fe/Au (mass ratio) | 28.6 | 2.9 |
| Second layer treating fluid (2) | Terpineol | 87.50 g |  |
|  | Nitrocellulose | — |  |
|  | Ethyl cellulose | 7.0 g |  |
|  | Silicon varnish (50%) | 5.5 g |  |
|  | Wet film thickness | 12 μm |  |
|  | Film thickness after baking | 200 nm | 200 nm |
| Optical properties | Hz ratio (%) | 0.23 | 0.25 |
|  | Tv (%) | 83.76 | 76.19 |
|  | Rv (incident angle of 5°) (%) | 4.87 | 5.18 |
|  | Rv (incident angle of 60°) (%) | 10.06 | 8.91 |
|  | Transmission color: x | 0.3072 | 0.3059 |
|  | Transmission color: y | 0.3236 | 0.3216 |
| Chemical resistance | ΔTv (alkali resistance) (%) | 0.28 | 0.29 |
|  | ΔRv (alkali resistance) (%) | 0.33 | 0.42 |
|  | ΔTv (acid resistance) (%) | 0.35 | 0.62 |
|  | ΔRv (acid resistance) (%) | 0.32 | 0.38 |
| Abrasion resistance | Rubbing abrasion test (appearance) | ○ |  |
|  | Taber abrasion test (appearance) | 6 |  |

TABLE 3

|  | Composition of treating fluid | Ex. 7 | Ex. 8 | Ex. 9 | Ex. 10 | Ex. 11 |
|---|---|---|---|---|---|---|
| First layer treating fluid (1) | Butyl lactate | 89.45 g | 89.43 g | 89.45 g | 89.48 g |  |
|  | Nitrocellulose |  |  | 8.4 g |  |  |
|  | Iron octenoate |  |  | 2.0 g |  |  |
|  | Gold colloidal dispersion (a) | 0.15 g | 0.17 g | 0.15 g | 0.12 g | — |
|  | Gold colloidal dispersion (b) | — |  | — |  | 0.12 g |
|  | Wet film thickness |  |  | 12 μm |  |  |
|  | Film thickness after baking |  |  | 15 nm |  |  |
|  | Fe/Au (mass ratio) | 13.3 | 11.8 | 13.3 | 16.7 |  |
| Second layer treating fluid (2) | Butyl lactate | 86.62 g | 86.40 g |  | 86.62 g |  |
|  | Nitrocellulose |  |  | 8.0 g |  |  |
|  | Silicon varnish (50%) | 4.8 g | 5.0 g |  | 4.8 g |  |
|  | Organic titanium compound | 0.58 g | 0.60 g |  | 0.58 g |  |
|  | Wet film thickness |  |  | 12 μm |  |  |
|  | Film thickness after baking | 100 nm | 112 nm |  | 100 nm |  |
| Optical properties | Hz ratio (%) | 0.4 | 0.4 | 0.4 | 0.4 | 0.5 |
|  | Tv (%) | 75.9 | 76.8 | 76.0 | 77.8 | 78.6 |
|  | Rv (incident angle of 5°) (%) | 4.1 | 4.1 | 4.2 | 3.9 | 4.1 |
|  | Rv (incident angle of 60°) (%) | 10.0 | 9.8 | 10.8 | 10.8 | 10.9 |
|  | Transmission color: x | 0.3056 | 0.3050 | 0.3055 | 0.3043 | 0.2671 |
|  | Transmission color: y | 0.3230 | 0.3188 | 0.3205 | 0.3211 | 0.2718 |
| Chemical resistance | ΔTv (alkali resistance) (%) | 0.31 | 0.26 | 0.42 | 0.31 | 0.39 |
|  | ΔRv (alkali resistance) (%) | 0.52 | 0.43 | 0.35 | 0.59 | 0.51 |
|  | ΔTv (acid resistance) (%) | 0.29 | 0.54 | 0.38 | 0.61 | 0.31 |
|  | ΔRv (acid resistance) (%) | 0.32 | 0.32 | 0.20 | 0.49 | 0.52 |
| Abrasion resistance | Rubbing abrasion test (appearance) | ○ | ○ | ○ | ○ | ○ |
|  | Taber abrasion test (appearance) |  |  | 1 |  | 3 |

* Organic titanium compound: Titanium diisopropoxy bisacetylacetonate (the same applies in the following Tables).

TABLE 4

|  | Composition of treating fluid | Ex. 12 | Ex. 13 | Ex. 14 | Ex. 15 | Ex. 16 |
|---|---|---|---|---|---|---|
| First layer treating fluid (1) | Butyl lactate |  |  | 89.48 g |  |  |
|  | Nitrocellulose |  |  | 8.4 g |  |  |
|  | Iron octenoate |  |  | 2.0 g |  |  |
|  | Gold colloidal dispersion (a) | 0.12 g | — | 0.12 g | — | 0.12 g |
|  | Gold colloidal dispersion (b) | — | 0.12 g | — | 0.12 g | — |
|  | Wet film thickness |  |  | 12 μm |  |  |
|  | Film thickness after baking |  |  | 15 nm |  |  |
|  | Fe/Au (mass ratio) |  |  | 16.7 |  |  |
| Second layer treating fluid (2) | Butyl lactate | 86.50 g |  | 86.84 g |  | 87.50 g |
|  | Nitrocellulose | 8.0 g |  |  | — |  |
|  | Ethyl cellulose | — |  |  | 7.0 g |  |
|  | Silicon varnish (50%) | 5.5 g |  |  | 5.5 g |  |
|  | Organic titanium compound | — |  | 0.66 g |  | — |
|  | Wet film thickness |  |  | 12 μm |  |  |
|  | Film thickness after baking | 125 nm |  | 134 m |  | 200 nm |
| Optical properties | Hz ratio (%) | 0.4 | 0.5 | 0.4 | 0.3 | 0.6 |
|  | Tv (%) | 77.7 | 78.2 | 79.9 | 78.9 | 79.5 |
|  | Rv (incident angle of 5°) (%) | 4.2 | 4.3 | 3.6 | 4.2 | 3.4 |
|  | Rv (incident angle of 60°) (%) | 10.1 | 9.8 | 9.6 | 8.1 | 9.3 |
|  | Transmission color: x | 0.3054 | 0.3052 | 0.3083 | 0.3097 | 0.3081 |
|  | Transmission color: y | 0.3183 | 0.3216 | 0.3197 | 0.3207 | 0.3197 |
| Chemical resistance | ΔTv (alkali resistance) (%) | 0.62 | 0.33 | 0.42 | 0.53 | 0.38 |
|  | ΔRv (alkali resistance) (%) | 0.39 | 0.49 | 0.19 | 0.39 | 0.41 |
|  | ΔTv (acid resistance) (%) | 0.48 | 0.28 | 0.33 | 0.44 | 0.56 |
|  | ΔRv (acid resistance) (%) | 0.63 | 0.45 | 0.47 | 0.51 | 0.61 |
| Abrasion resistance | Rubbing abrasion test (appearance) | ○ | ○ | ○ | ○ | ○ |
|  | Taber abrasion test (appearance) | 2 | 4 | 5 | 6 | 5 |

TABLE 5

|  | Composition of treating fluid | Ex. 17 | Ex. 18 | Ex. 19 | Ex. 20 | Ex. 21 |
|---|---|---|---|---|---|---|
| First layer treating fluid (1) | Butyl lactate | 89.48 g | 89.45 g |  | 90.45 g |  |
|  | Nitrocellulose |  |  | 8.4 g |  |  |
|  | Organic iron compound | 2.0 g | — |  |  |  |
|  | Organic titanium compound | — | 2.0 g |  |  |  |
|  | Organic zirconium compound | — | — |  | 1.0 g |  |
|  | Gold colloidal dispersion (a) | — |  | 0.15 g |  |  |
|  | Gold colloidal dispersion (b) | 0.12 g |  | — |  |  |

TABLE 5-continued

| | Composition of treating fluid | Ex. 17 | Ex. 18 | Ex. 19 | Ex. 20 | Ex. 21 |
|---|---|---|---|---|---|---|
| | Wet film thickness | | | 12 μm | | |
| | Film thickness after baking | | | 15 nm | | |
| | Fe/Au (mass ratio) | 16.7 | — | — | — | — |
| | Ti or Zr/Au (mass ratio) | — | Ti/Au = 13.3 | | Zr/Au = 13.3 | |
| Second layer treating fluid (2) | Butyl lactate | 87.50 g | 85.73 g | 85.50 g | 86.40 g | 85.95 g |
| | Ethyl cellulose | 7.0 g | | | | |
| | Nitrocellulose | — | | 8.0 g | | |
| | Silicon varnish (50%) | 5.5 g | 5.6 g | 5.8 g | 5.0 g | 5.4 g |
| | Organic titanium compound | — | 0.67 g | 0.70 g | 0.60 g | 0.65 g |
| | Wet film thickness | | | 12 μm | | |
| | Film thickness after baking | 200 nm | 134 nm | 148 nm | 112 nm | 120 nm |
| Optical properties | Hz ratio (%) | 0.3 | 0.3 | 0.2 | 0.3 | 0.3 |
| | Tv (%) | 75.7 | 75.3 | 74.0 | 77.6 | 77.0 |
| | Rv (incident angle of 5°) (%) | 3.6 | 4.3 | 4.5 | 4.2 | 4.7 |
| | Rv (incident angle of 60°) (%) | 11.0 | 10.3 | 10.8 | 10.5 | 10.1 |
| | Transmission color: x | 0.3040 | 0.3034 | 0.3022 | 0.3050 | 0.3075 |
| | Transmission color: y | 0.3164 | 0.3169 | 0.3170 | 0.3193 | 0.3201 |
| Chemical resistance | ΔTv (alkali resistance) (%) | 0.32 | 0.24 | 0.19 | 0.44 | 0.33 |
| | ΔRv (alkali resistance) (%) | 0.65 | 0.46 | 0.28 | 0.16 | 0.45 |
| | ΔTv (acid resistance) (%) | 0.38 | 0.31 | 0.33 | 0.24 | 0.33 |
| | ΔRv (acid resistance) (%) | 0.24 | 0.44 | 0.32 | 0.19 | 0.25 |
| Abrasion resistance | Rubbing abrasion test (appearance) | ○ | ○ | ○ | ○ | ○ |
| | Taber abrasion test (appearance) | 6 | 2 | 2 | 5 | 5 |

TABLE 6

| | Composition of treating fluid | Comp. Ex. 1 | Comp. Ex. 2 |
|---|---|---|---|
| First layer treating fluid (1) | Butyl carbitol | — | 90.0 g |
| | Gold colloidal dispersion (b) | — | 1.60 g |
| | Nitrocellulose | — | 8.4 g |
| | Iron octenoate | — | — |
| | Organic titanium compound | — | — |
| | Wet film thickness | — | 13 μm |
| | Film thickness after baking | — | — |
| | Fe/Au (mass ratio) | — | — |
| Second layer treating fluid (2) | Terpineol | — | 87.50 g |
| | Nitrocellulose | — | — |
| | Ethyl cellulose | — | 7.0 g |
| | Silicon varnish (50%) | — | 5.5 g |
| | Wet film thickness | — | 12 μm |
| | Film thickness after baking | — | 200 nm |
| Optical properties | Hz ratio (%) | 0.56 | 0.35 |
| | Tv (%) | 82.20 | 79.35 |
| | Rv (incident angle of 5°) (%) | 7.20 | 4.21 |
| | Rv (incident angle of 60°) (%) | 14.50 | 11.36 |
| | Transmission color: x | 0.3060 | 0.3078 |
| | Transmission color: y | 0.3190 | 0.3184 |
| Chemical resistance | ΔTv (alkali resistance) (%) | — | 0.33 |
| | ΔRv (alkali resistance) (%) | — | 0.42 |
| | ΔTv (acid resistance) (%) | — | 0.28 |
| | ΔRv (acid resistance) (%) | — | 0.44 |
| Abrasion resistance | Rubbing abrasion test (appearance) | — | ○ |
| | Taber abrasion test (appearance) | — | 6 |

TABLE 7

| | Composition of treating fluid | Comp. Ex. 3 |
|---|---|---|
| First layer treating fluid (1) | Butyl lactate | 91.43 g |
| | Ethyl cellulose | — |
| | Nitrocellulose | 8.4 g |
| | Iron octenoate | — |
| | Gold colloidal dispersion (a) | — |
| | Gold colloidal dispersion (b) | 0.17 g |
| | Wet film thickness | 12 μm |
| | Film thickness after baking | 30 nm |
| | Fe/Au (mass ratio) | — |
| Second layer treating fluid (2) | Butyl lactate | 85.5 g |
| | Ethyl cellulose | — |
| | Nitrocellulose | 8.0 g |
| | Silicon varnish (50%) | 6.5 g |
| | Wet film thickness | 12 μm |
| | Film thickness after baking | 150 nm |
| Optical properties | Hz ratio (%) | 0.5 |
| | Tv (%) | 66.4 |
| | Rv (incident angle of 5°) (%) | 3.7 |
| | Rv (incident angle of 60°) (%) | 9.2 |
| | Transmission color: x | 0.3018 |
| | Transmission color: y | 0.3089 |

TABLE 7-continued

| | Composition of treating fluid | Comp. Ex. 3 |
|---|---|---|
| Chemical resistance | ΔTv (alkali resistance) (%) | 0.34 |
| | ΔRv (alkali resistance) (%) | 0.29 |
| | ΔTv (acid resistance) (%) | 0.38 |
| | ΔRv (acid resistance) (%) | 0.41 |
| Abrasion resistance | Rubbing abrasion test (appearance) | ○ |
| | Taber abrasion test (appearance) | 4 |

Measurement of Average Primary Particle Diameter of Fine Gold Particles in Low Reflection Film The particle diameters of fine gold particles in the low reflection films of the low reflection glass plates obtained in the above Examples 7, 9, 11 and 13 were measured, and the average primary particle diameters and standard deviations of the fine gold particles in the low reflection films were measured. The measurement method is as follows.

The sample of the low reflection glass plate was left to stand for 60 seconds in a box type plastic container filled with a hydrofluoric acid vapor, and then the sample was taken out of the above container. Then, the above sample was slowly put into a petri dish filled with water, and the film was peeled from the glass plate. The film floating on the water surface was scooped with a copper grit to obtain a sample for TEM. Then, a TEM photograph was prepared by TEM (JEM2010 manufactured by JEOL Ltd.). The area (Q) of fine gold particles in the photograph was calculated, and the particle diameter 2r was calculated from the formula $Q=\pi r^2$ (r is the radius of a particle) on the assumption that each particle is spherical. The particle diameters of 275 fine gold particles in the TEM photograph were measured to investigate the particle diameter distribution. The results were as follows.

Example 7: Average primary particle diameter 6.40 nm, standard deviation 3.96 nm Example 9: Average primary particle diameter 6.21 nm, standard deviation 2.52 nm Example 11: Average primary particle diameter 9.69 nm, standard deviation 9.60 nm Example 13: Average primary particle diameter 11.26 nm, standard deviation 13.22 nm By comparison between the above average primary particle diameters and the results of the Taber abrasion test in Table 1, it is evident that the abrasion resistance of the low reflection film is better as the average primary particle diameter is smaller.

Measurement of Gold and Iron Concentrations in Low Reflection Films

The gold contents and the iron contents (metal atomic %) in the low reflection films of the low reflection glass plates in Examples 3 and 7 were measured by ESCA. The results (average values of two point measurements) are as follows.

Example 3: Gold content 0.068535%, iron content 1.42060%

Example 7: Gold content 0.20323%, iron content 2.29401%

Figure 4:
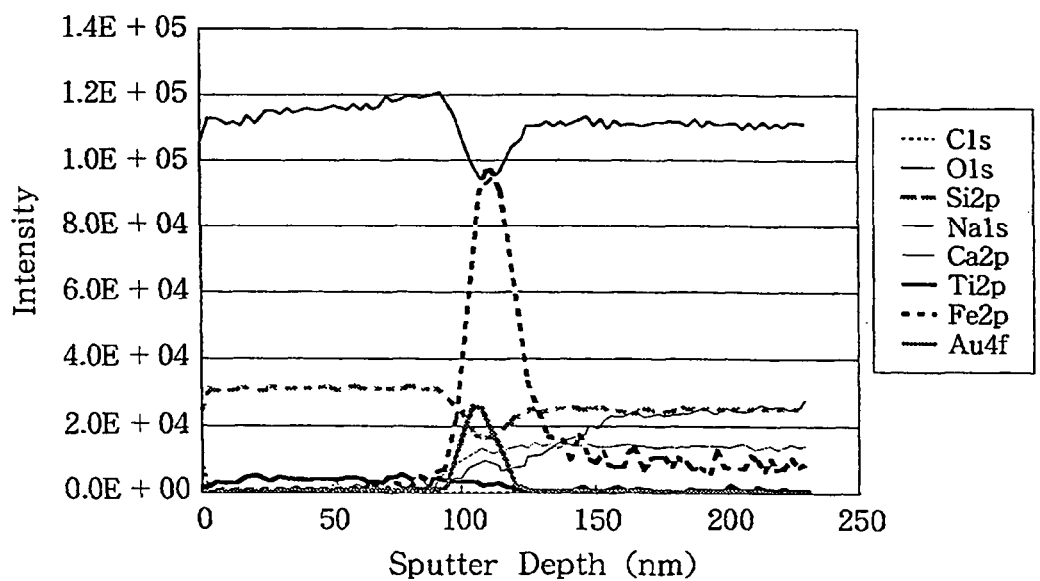
FIG. 4 is ESCA spectra which are obtained by measuring the contents of atoms in the low reflection film of the low reflection glass plate in Example 3.

Further, the ESCA spectra, based on which the atomic content (metal atomic %) in the low reflection film of the low reflection glass plate in Example 3 was measured, are shown in FIG. 4 for reference.

As shown in Tables 1 to 7, in Comparative Example 2, the visible light reflectance at an incident angle of 60° is high, and in Comparative Example 3, the visible light transmittance is low, whereby the object of the present invention cannot be achieved. Whereas, the samples in Examples 1 to 21 have excellent low reflecting functions at incident angles of both 5° and 60°, and low reflection films having good alkali resistance and acid resistance were obtained. Further, the low reflection glass plates in Examples 1 to 4 and 6 were found to exhibit a blue color. The film surface is made of silicon and oxygen, and the presence of iron and gold can be confirmed in the vicinity of the glass substrate as shown in FIGS. 2 and 3. Further, as shown in FIGS. 2 and 3, diffusion of gold reaches the position where iron is present, and therefore the samples are considered to exhibit a blue color.

Further, Examples in which nitrocellulose was used for both treating fluids 1 and 2, showed good results also in the Taber abrasion tests, and were found to be useful even under the severe conditions. Further, with respect to the treating fluid 2, the presence or absence of a titanium compound and the particle diameters of fine gold particles in the film were found to give an influence on the abrasion resistance. On the other hand, in Examples where nitrocellulose is used for the treating fluid 1 and ethyl cellulose is used for the treating fluid 2, it is found that the transmittance is high, and the low reflecting properties are excellent. Further, between Examples 14 and 15 and Examples 16 and 17, there were no differences in abrasion resistance in the Taber abrasion test even though there are differences in the presence or absence of the titanium compound blended in the treating fluid 2. Namely, it is considered that the abrasion attributable to ethyl cellulose blended in the treating fluids 2 in Examples 14 to 17 is so large that very small merits or demerits by the presence or absence of the titanium compound blended can not be observed visually, and consequently, the evaluation results became the same.

Figure 5:
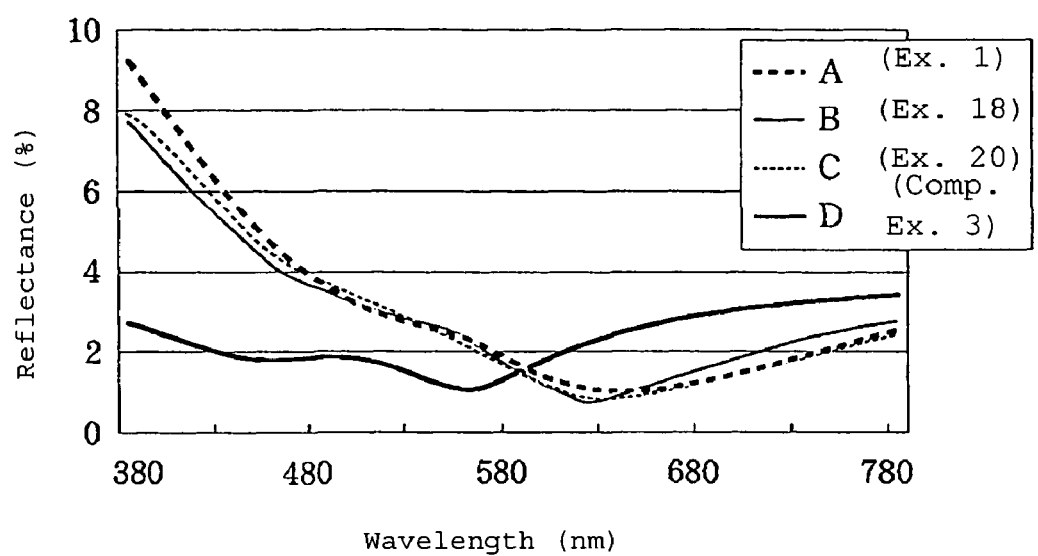
FIG. 5 shows reflectance spectra of low reflection glass plates in Examples 1, 18 and 20, and Comparative Example 3.

Further, according to the reflectance spectrum shown in FIG. 5, the sample containing titanium was found to have lower abrasion resistance than the sample containing iron, though there are no differences in the low reflecting properties depending on the type of metal in the organic metal compound blended in the treating fluid 1. Further, according to the reflectance spectrum shown in FIG. 5, the film containing an oxide of an organic iron compound and fine gold particles in combination, shows an absorption peak in the vicinity of 630 nm, and has a peak relatively broad in shape in the absorption curve, in the case where an organic metal compound of at least one metal selected from the group consisting of iron, titanium and zirconium is blended in the treating fluid 1, as compared with the case where the organic metal compound is not blended therewith. Accordingly, the film formed by the method of the present invention was found to have an effect of reducing the reflectance not only against light at an incident angle of 5°, but also against light at an incident angle of 60°.

INDUSTRIAL APPLICABILITY

As described in the foregoing, in the present invention, a colored low reflection glass plate can be obtained by coating the surface of the glass substrate with a treating fluid in combination of the treating fluid (1) and the treating fluid (2), followed by drying and baking, and it is possible to obtain a low reflection glass plate which has an excellent film-forming properties, good alkali resistance and acid resistance of the film, a low Hz ratio and low reflectance. This low reflection property is effective not only against visible light at an incident angle of 5°, but also against visible light at an incident angle of 60°. Further, a heat-shielding effect can be obtained if the transparent glass substrate is a heat absorbing glass or a highly heat absorbing glass such as green-colored glass.

Further, the film formed on the low reflection glass plate obtained by the present invention is characterized in that the components change in the direction of the film thickness, namely, the refractive index changes in the direction of the film thickness, whereby good reflection properties can be obtained. Further, by the combination of fine gold particles and the film-forming compound to be blended in the treating fluids (1) and (2), a low reflection glass plate showing a blue color can be obtained, when applied on a green-colored substrate.

The entire disclosure of Japanese Patent Application No. 2003-024774 filed on Jan. 31, 2003 including specification, claims, drawings and summary is incorporated herein by reference in its entirety.

What is claimed is:

1. A process for producing a low reflection glass plate, characterized by the use of a treating fluid (1) comprising a resin B1, fine gold particles, an organic metal compound of at least one metal (M1) selected from the group consisting of iron, titanium and zirconium, and an organic solvent, and a treating fluid (2) comprising a film-forming compound, a resin B2 having a higher thermal decomposition temperature than the resin B1 and an organic solvent, said process comprising applying the treating fluid (1) on the surface of a transparent glass substrate, followed by drying at a temperature of from 50 to 250° C. to remove the organic solvent, further applying the treating fluid (2), followed by drying at a temperature of from 50 to 250° C. to remove the organic solvent, and then baking the treated transparent glass substrate at a temperature of from 400 to 800° C.

2. The process for producing a low reflection glass plate according to claim 1, wherein the thermal decomposition temperature of the resin B1 is from 150 to 300° C.

3. The process for producing a low reflection glass plate according to claim 1, wherein the organic metal compound is an organic iron compound.

4. The process for producing a low reflection glass plate according to claim 1, wherein the M1/Au ratio (mass ratio) of the metal (M1) in the organic metal compound to the fine gold particles, is from 3 to 25.

5. The process for producing a low reflection glass plate according to claim 1, wherein the resin B1 is nitrocellulose, and the resin B2 is ethyl cellulose.

6. The process for producing a low reflection glass plate according to claim 1, wherein the transparent glass substrate is a heat absorbing glass; the treating fluid (2) contains an organic silicon compound as the film-forming compound; and the transmission color of the obtained low reflection glass plate is blue.

7. The process for producing a low reflection glass plate according to claim 1, wherein the film made of the treating fluid (1) has a film thickness of from 5 to 50 nm after baking, and the film made of the treating fluid (2) has a film thickness of from 50 to 350 nm after baking.

* * * * *